United States Patent
Yerli

(10) Patent No.: US 12,377,872 B2
(45) Date of Patent: Aug. 5, 2025

(54) LOCATION-BASED AUTONOMOUS NAVIGATION USING A VIRTUAL WORLD SYSTEM

(71) Applicant: TMRW Group IP, Luxembourg (LU)

(72) Inventor: Cevat Yerli, Frankfurt am Main (DE)

(73) Assignee: TMRW Group IP, Luxembourg (LU)

( * ) Notice: Subject to any disclaimer, the term of this patent is extended or adjusted under 35 U.S.C. 154(b) by 253 days.

(21) Appl. No.: 17/730,987

(22) Filed: Apr. 27, 2022

(65) Prior Publication Data

US 2023/0347923 A1  Nov. 2, 2023

(51) Int. Cl.
*G05B 19/4155* (2006.01)
*B60W 60/00* (2020.01)

(52) U.S. Cl.
CPC ....... *B60W 60/001* (2020.02); *G05B 19/4155* (2013.01); *B60W 2556/45* (2020.02); *G05B 2219/50391* (2013.01)

(58) Field of Classification Search
CPC ............ B60W 60/001; B60W 2556/45; G05B 19/4155; G05B 2219/50391
See application file for complete search history.

(56) References Cited

U.S. PATENT DOCUMENTS

| 10,371,544 | B2 | 8/2019 | Yoo et al. | |
| 2017/0287214 | A1* | 10/2017 | Anderson | G06F 3/011 |
| 2019/0361589 | A1* | 11/2019 | Yerli | B25J 9/1689 |

(Continued)

FOREIGN PATENT DOCUMENTS

| EP | 3742360 A1 | 11/2020 |
| EP | 3754468 A1 | 11/2020 |

(Continued)

OTHER PUBLICATIONS

Whitty, M. et al., "Autonomous Navigation using a Real-Time 3D Point Cloud," ResearchGate, Jan. 2010, 11 pages.

(Continued)

*Primary Examiner* — Vivek D Koppikar
*Assistant Examiner* — Jeffrey R Chalhoub
(74) *Attorney, Agent, or Firm* — BRYAN CAVE LEIGHTON PAISNER LLP

(57) ABSTRACT

A system, method, autonomous mobile robot, and computer readable media enabling location-based autonomous navigation using a virtual world system. The system comprises at least one server computing device having at least one processor and a memory. The memory stores a virtual world system and computer-readable instructions. The virtual world system comprises at least one virtual object being spatially defined by virtual three-dimensional coordinates that correspond to three-dimensional coordinates of a corresponding physical object in a physical environment. The instructions cause the at least one server computing device to provide a navigation engine configured to compute a navigation route of at least one autonomous mobile robot using at least the virtual three-dimensional coordinates of the at least one virtual object, enabling the at least one autonomous mobile robot to autonomously navigate the physical environment by reference to a virtual replica of the physical environment comprised in the virtual world system.

18 Claims, 5 Drawing Sheets

(56) References Cited

U.S. PATENT DOCUMENTS

2020/0150655 A1* 5/2020 Artes .................. G05D 1/0016
2020/0209005 A1   7/2020 Hou et al.
2021/0287459 A1   9/2021 Cella et al.

FOREIGN PATENT DOCUMENTS

WO    2017/172180 A1   10/2017
WO    2021189374 A1    9/2021

OTHER PUBLICATIONS

Evans, J.M., et al., "Three Dimensional Data Capture in Indoor Environments for Autonomous Navigation," NIST Internal Report #6912, Sep. 2002, pp. 1-7.

* cited by examiner

LOCATION-BASED AUTONOMOUS NAVIGATION USING A VIRTUAL WORLD SYSTEM

FIELD

The present disclosure generally relates to computer systems, and more specifically to a system, method, autonomous mobile robot and computer-readable media enabling location-based autonomous navigation using a virtual world system.

BACKGROUND

Autonomous mobile robots, including drones, autonomous vehicles, and other computing devices configured to move and autonomously perform a plurality of tasks, are becoming more widespread in recent years due to improvements, amongst others, in robotics, artificial intelligence, localization technologies and networks.

One challenge that is present in current autonomous mobile robots is the movement in certain complex structures such as rooms comprising a plurality of obstacles, or climbing structures such as stairs. Solutions so far has been, apart from a gradual improvement in artificial intelligence and machine learning algorithms, to use sensors, such as optical sensors (e.g., cameras, simultaneous localization and mapping (SLAM) sensors, acoustic sensors, and the like) to locate any obstacles in the room for avoiding any danger for the autonomous mobile robot.

In some occasions, a lot of involvement from human operators may be necessary to ensure a smoother displacement of the (semi)autonomous mobile robots from one area to another one. Furthermore, the extra processing required to both locate the path within an area using the sensors and/or real-time generated maps through SLAM can be cumbersome and heavy for the processor of the autonomous mobile robots.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system is provided that comprises at least one server computing device having at least one processor and a memory. The memory stores a virtual world system and computer-readable instructions. The virtual world system comprises at least one virtual object being spatially defined by virtual three-dimensional coordinates that correspond to three-dimensional coordinates of a corresponding physical object in a physical environment. The instructions cause the at least one server computing device to provide a navigation engine configured to compute a navigation route of at least one autonomous mobile robot using at least the virtual three-dimensional coordinates of the at least one virtual object, enabling the at least one autonomous mobile robot to autonomously navigate the physical environment by reference to a virtual replica of the physical environment comprised in the virtual world system.

In some embodiments, at least one virtual object in the virtual world system is a navigational virtual object representing a navigable structure of the physical environment, the navigational virtual object comprising navigation data defining one or more possible navigation paths associated with the navigable structure. In some embodiments, the navigation route is computed by the navigation engine using at least the navigation data of the navigational virtual object. In some embodiments, the at least one navigational virtual object is transmitted to the at least one autonomous mobile robot via a network as the autonomous mobile robot approaches the navigable structure.

In some embodiments, the navigation route is computed by the navigation engine using at least data captured by at least one sensor of the autonomous mobile robot. In some embodiments, the virtual objects include at least one virtual corridor that virtually couples at least two physical objects via a connection between the virtual corridor and virtual objects that correspond to the at least two physical objects.

In some embodiments, a method is provided. In a virtual world system provided in memory of at least one server computing device, at least one virtual object is created, wherein the at least one virtual object is spatially defined by virtual three-dimensional coordinates that correspond to three-dimensional coordinates of a corresponding physical object in a physical environment. A navigation engine stored in memory of the at least one server computing device receives data defining a destination of an autonomous mobile robot. The navigation engine computes a navigation route for the autonomous mobile robot using at least the data defining the destination and the virtual three-dimensional coordinates of the at least one virtual object, enabling the at least one autonomous mobile robot to autonomously navigate the physical environment by reference to a virtual replica of the physical environment comprised in the virtual world system.

In some embodiments, at least one virtual object in the virtual world system is a navigational virtual object representing a navigable structure of the physical environment, the navigational virtual object comprising navigation data defining one or more possible navigation paths associated with the navigable structure. In some embodiments, computing the navigation route includes computing the navigation route using at least the navigation data of the navigational virtual objects. In some embodiments, the method further comprises transmitting the at least one navigational virtual object to the at least one autonomous mobile robot via a network as the autonomous mobile robot approaches the physical structure.

In some embodiments, computing the navigation route includes computing the navigation route using at least data captured by at least one sensor mounted on the autonomous mobile robot. In some embodiments, the virtual objects include at least one virtual corridor that virtually couples at least two physical objects via a connection between the virtual corridor and virtual objects that correspond to the at least two physical objects.

In some embodiments, an autonomous mobile robot is provided. The autonomous mobile robot comprises a control unit, a drive unit, and a communication unit. The control unit comprises at least one processor and a memory. The drive unit is configured to convert signals from the control unit into a movement of the autonomous mobile robot. The communication unit is configured to communicatively couple the autonomous mobile robot via a network to at least one server computing device storing a navigation engine and a virtual world system. The memory has instructions stored thereon that, in response to execution by the at least one processor, cause the autonomous mobile robot to perform actions comprising: receiving a navigation route computed by the navigation engine of the at least one server computing device using at least virtual three-dimensional coordinates of virtual objects in the virtual world system that correspond to three-dimensional coordinates of corresponding physical objects in a physical environment and navigation destination data; and autonomously navigating the physical environment using the navigation route.

In some embodiments, at least one virtual object in the virtual world system is a navigational virtual object representing a navigable structure of the physical environment, the navigational virtual object comprising navigation data defining one or more possible navigation paths associated with the navigable structure. In some embodiments, the navigation route is computed by the navigation engine using at least the navigation data of the navigational virtual object. In some embodiments, the actions further comprise receiving the navigational virtual object from the at least one server computing device via the network as the autonomous mobile robot approaches the navigable structure.

In some embodiments, the autonomous mobile robot further comprises at least one sensor, and the actions further comprise transmitting data captured by the at least one sensor to the at least one server computing device for computing the navigation route. In some embodiments, the virtual objects include at least one virtual corridor that virtually couples at least two physical objects via a connection between the virtual corridor and virtual objects that correspond to the at least two physical objects.

In some embodiments, a non-transitory computer-readable medium is provided. The medium has computer-executable instructions stored thereon that, in response to execution by one or more processors of a server computing device, cause the server computing device to perform actions comprising: creating, in a virtual world system provided in memory of at least one server computing device, at least one virtual object, wherein the at least one virtual object is spatially defined by virtual three-dimensional coordinates that correspond to three-dimensional coordinates of a corresponding physical object in a physical environment; receiving, by a navigation engine stored in memory of the at least one server computing device, data defining a destination of an autonomous mobile robot; and computing, by the navigation engine, a navigation route for the autonomous mobile robot using at least the data defining the destination and the virtual three-dimensional coordinates of the at least one virtual object, enabling the at least one autonomous mobile robot to autonomously navigate the physical environment by reference to a virtual replica of the physical environment comprised in the virtual world system.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Some of the technical problems disclosed in the background may be solved by one or more aspects of the current disclosure, where a system, method, autonomous mobile robot and computer-readable media enabling location-based autonomous navigation using a virtual world system. In the current disclosure, alternative sources for calculating a navigation route may be enabled, which may provide further data to a navigation engine to compute, update and enhance the navigation route to enable the autonomous mobile robot to navigate within indoor or outdoor spaces. The navigation engine may obtain at least a navigation destination data and three-dimensional coordinates of at least one virtual object representing real-world objects in the navigation space of the at least one autonomous mobile robot. This data may be used by the navigation engine to compute the navigation route. Furthermore, the navigation engine may further utilize data from at least one navigational virtual object representing navigable structures of the real world, the navigational virtual objects comprising navigation data and instructions defining one or more possible navigation paths for the at least one autonomous mobile robot. The navigation engine may further update and enhance the navigation route by utilizing sensor data from the at least one autonomous mobile robot. The navigation engine may further utilize virtual corridors connecting one area or virtual object to another one, providing a navigation path for the at least one autonomous mobile robot. Thus, with the plurality of navigation sources, the navigation route of the current disclosure may assist in a smoother navigation by the at least one autonomous mobile robot, decreasing chances of collision or damages to structures of the internal or external environment, people or the autonomous mobile robot itself.

Figure 1:
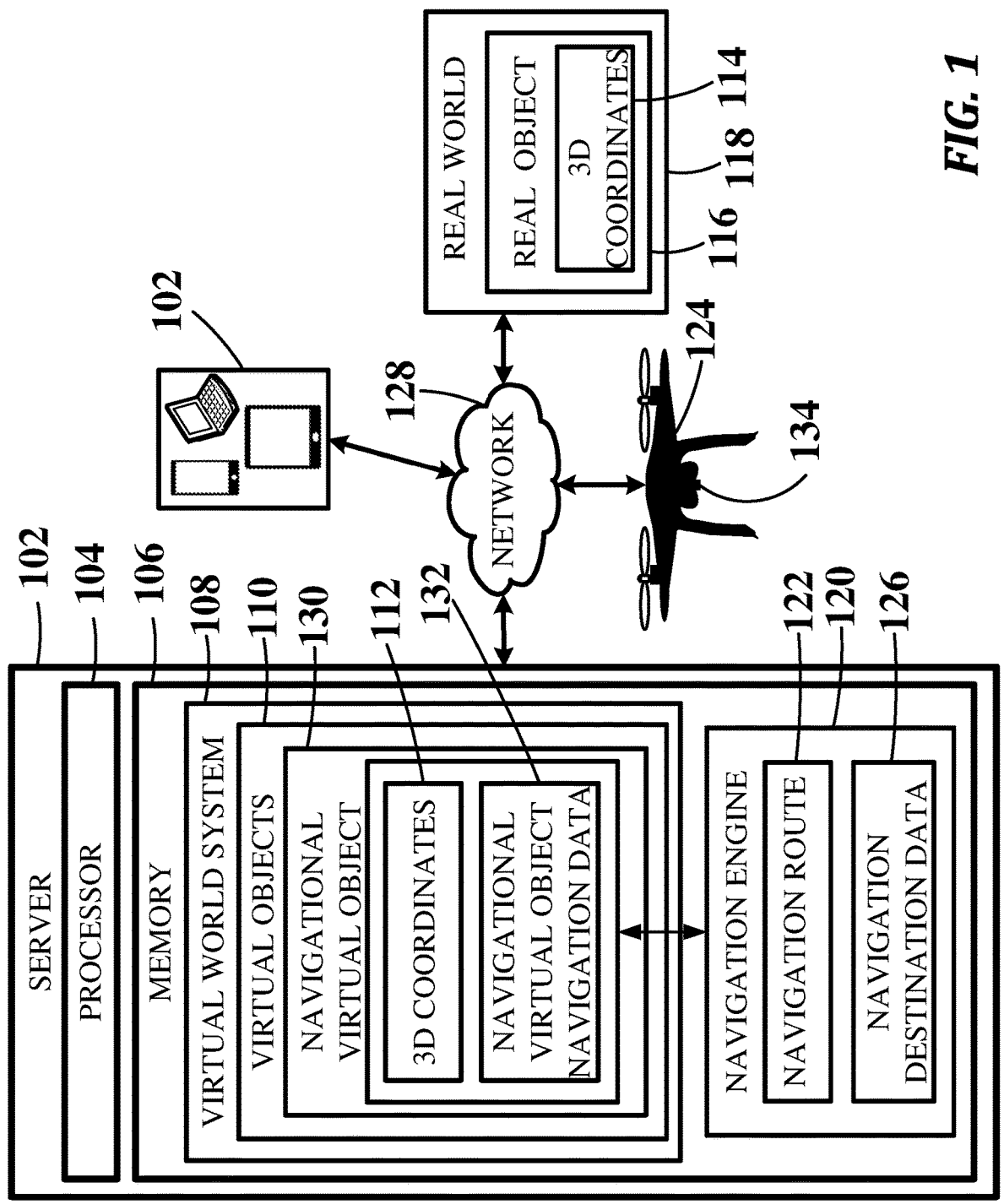
FIG. 1 depicts a schematic representation of a system enabling location-based autonomous navigation, according to an embodiment.

FIG. 1 depicts a schematic representation of a system 100 enabling location-based autonomous navigation, according to an embodiment.

The system 100 comprises at least one server computing device 102 of a server computing device system comprising at least one processor 104 and memory 106 storing a virtual world system 108 comprising at least one virtual object 110 being spatially defined by virtual three-dimensional geolocation coordinates 112 matching the three-dimensional geolocation coordinates 114 of a corresponding real world object 116 in the real world 118. The memory further stores a navigation engine 120 configured to compute the navigation route 122 of at least one autonomous mobile robot 124 based on navigation destination data 126 and considering the three-dimensional geolocation coordinates 112 of the at least one virtual object 110, enabling the at least one autonomous mobile robot 124 to autonomously navigate the real world through a virtual replica of the at least one autonomous mobile robot 124 comprised in the virtual world system 108 connected to one or more corresponding motion mechanisms and circuitry. The at least one server computing device 102 connects to the at least one autonomous mobile robot 124 via a network 128.

The system 100 of the current disclosure may implement distributed computing capabilities employing public or private cloud servers, fog servers, and systems, such as enterprise systems, mobile platforms, machinery, robots, sensors or user devices, all of which may connect through a network 128. This way, resources including physical servers and network equipment enable a shared storage and computing that may be dynamically allocated depending on factors such as the distance of the user to the resources and the network and computational demand from the users.

According to an embodiment, tracking of devices is performed by one or more of time of arrival (TOA), angle of arrival (AOA), and visual imaging techniques. The tracking may be performed by one or more of radar technology, antennas, Wi-Fi, inertia measuring units, gyroscopes, and accelerometers.

In some embodiments, in order to reduce hardware and network demands, contribute to the reduction of network latency, and improve the general merged reality experience, the system may connect through a network 128 including millimeter-wave (mmW) or combinations of mmW and sub 6 GHz communication systems, such as through 5th generation wireless systems communication (5G). In other embodiments, the system may connect through wireless local area networking (Wi-Fi) providing data preferably at 60 GHz. Provided communication systems may allow for about low end-to-end (E2E) latency and high downlink speeds to end points in the field. This results in high-quality, low latency, real-time digital application content streaming. In other embodiments, the system may communicatively connect through 4th generation wireless systems communication (4G), may be supported by 4G communication systems, or may include other wired or wireless communication systems.

In an exemplary embodiment, the autonomous mobile robot 124 may refer to a machine, such as a computer-programmable machine, capable of carrying complex actions automatically. In the current disclosure, the autonomous mobile robot 124 receives navigation instructions from the navigation engine 120 through the at least one server computing device 102, and processes the instructions for navigation. For example, the autonomous mobile robot 124 may be a factory machine, such as one or more robots used for a plurality of tasks, such as painting, welding, assembling, packaging, labeling, pick and place (e.g., for printed circuit boards), etc. In another exemplary embodiment, the autonomous mobile robot 124 may refer to aerial vehicles (e.g., planes, drones, helicopters, etc.), land vehicles (e.g., autonomous cars, motor bikes, trucks, etc.), and sea vehicles (e.g., autonomous boats, cargo ships, submarines, etc.).

In some embodiments, some of the virtual objects 110 in the virtual world system 108 are navigational virtual objects 130 representing navigable structures of the real world 118, the navigational virtual objects 130 comprising navigation data 132 and instructions defining one or more possible navigation paths for the at least one autonomous mobile robot.

In some embodiments, the navigation data 132 includes comprises a plurality of navigation paths including three-dimensional coordinates and a directional vector that may be used by the navigation engine to calculate the navigation route. The plurality of navigation paths may take into consideration other navigational virtual objects 130 close to the autonomous mobile robot 124 for determining the optimum path to be used in the computation of the navigation route. For example, an autonomous mobile robot 124 navigating towards a kitchen because of an initial input navigation destination data faces a table between the kitchen and the current location of the autonomous mobile robot 124. The navigation route calculated and updated in real-time by the navigation engine 120 may prompt the autonomous mobile robot 124 to skip the table because the table may provide the navigation engine with a three-dimensional coordinates and a directional vector that, when integrated in the navigation route, sends command signals to the robot to take a path that avoids crashing against the table. In some embodiments, the navigation destination data 126 is input through a user device 134, such as a mobile devices, personal computers, tablets, game consoles, media centers, and head-mounted displays, which is received by the navigation engine to be considered in the computation of the navigation route 122.

In some embodiments, the virtual objects 110 comprise the virtual replicas of real world objects 116, or purely virtual objects, or combinations thereof. In the current disclosure, the term "virtual replica" refers to an accurate and persistent virtual representation of a real world object 116. In an embodiment, the virtual replicas of the current disclosure refer to a virtual version, or virtual twin, of a real-world element, or real twin, which may either be mapped or modeled through computer assisted drawing (CAD) or computer-assisted engineering (CAE) methods, input by computer models of the real world objects 116 (e.g., building information models—BIMs) or other suitable methods, and which may mirror not just the appearance but also the behavior of the real twin. The real-world objects 116 may additionally include sensors that can provide the virtual replicas with multi-source input data for enriching and synchronizing the virtual replicas with their respective real counterpart. Thus, virtual replicas may obtain data from one or more sources (e.g., from one or more real-world objects, environmental sensors, computing devices, etc.). As used herein, the term "multi-source data" refers to data that may be obtained from multiple sources.

As explained above, virtual replicas may be updated based on multi-source data, such as by updating known parameters or features, by enriching the virtual replicas with additional parameters or features, or the like. In the current disclosure, the term "enriching" is used to describe the act of providing further properties to a virtual replica based on multi-source data. Enriching a virtual replica may be considered a special form of updating the virtual replica with one or more new forms of data that may not have been previously present in the virtual replica. For example, enriching the virtual replicas may refer to providing real-world data captured from sensing mechanisms on a plurality of devices, wherein the further real-world data comprises video data, temperature data, real-time energy consumption data, real-time water consumption data, speed or acceleration data, or the like.

In some embodiments, the navigation route 122 is further calculated and dynamically updated by the navigation engine 120 in view of the navigation data 132 of the navigational virtual objects 130.

In some embodiments, the at least one autonomous mobile robot 124 further comprises at least one sensor 134. The navigation engine 120 further utilizes the data captured by the at least one sensor 134 to update the navigation route 122 in real-time. The at least one sensor 134 may be optical and/or acoustic sensors such as triangulation sensors, cameras, laser scanners, ultrasonic scanners, tactile or touch-sensitive sensors for detecting obstacles, and the like configured to locate the autonomous mobile robot 400 within a reference plane. In other embodiments, sensors may also be included to provide data representations of other characteristics of the autonomous mobile robot 400 or surrounding areas, such as thermometers, pressure sensors, humidity sensors, and the like, as well as inertia sensors (e.g., IMUS, accelerometers, and gyroscopes) for determining the position and changes in the movement of the robot or wheel contact switches that detect a contact between a wheel and the floor.

In some embodiments, the at least one navigational virtual object is transmitted on demand to the at least one autonomous mobile robot via the network as the autonomous mobile robot approaches the real world object.

In some embodiments, the virtual objects comprise the virtual replicas of real world elements, or purely virtual objects, or combinations thereof, wherein at least some of the purely virtual objects are virtual corridors defining the navigation route of the at least one autonomous mobile robot by virtually coupling at least two real world objects via a connection between the virtual corridor and the corresponding virtual replicas of the at least two real world objects.

Figure 2:
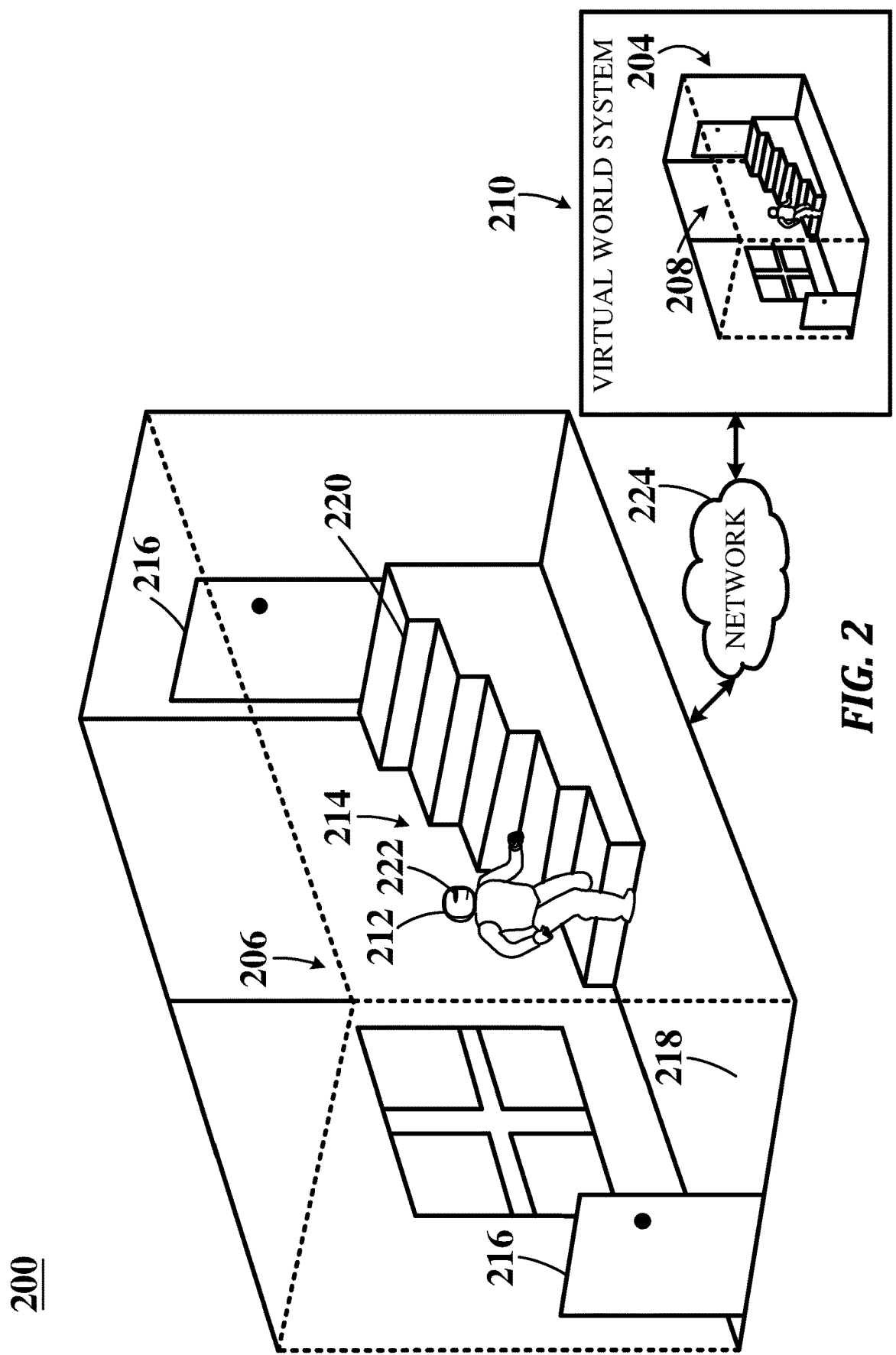
FIG. 2 depicts a schematic representation of a robot using the location-based autonomous navigation of the current disclosure, according to an embodiment.

FIG. 2 depicts a schematic representation of an indoor environment 200 using a location-based autonomous navigation system of the current disclosure, according to an embodiment.

The indoor environment 200 is stored in a virtual world system 210 as a virtual indoor environment 204, where all or most real world objects 206 in the indoor environment 200 comprise a corresponding virtual replica 208 stored in a virtual world system 210 from at least one server computing device connected to a robot 212 via a network 224. A robot 212 receives a navigation route computed by a navigation engine (e.g., navigation engine 120 of FIG. 1), thereby navigating the indoor environment 200.

For example, a memory of the robot 212 may receive, through a suitable network, the computed navigation route, which may be executed by at least one processor of the robot 212 to navigate the indoor environment 200 by activating a plurality of motion mechanisms (e.g., actuators and effectors) enabling the robot's movements. Actuators are the mechanisms that enable the effectors to execute an action, and may include electric motors, hydraulic cylinders, pneumatic cylinders, or combinations thereof. Effectors refer to any device that affects the environment of the robot 212, such as the indoor environment 200, and may include the robot's legs, wheels, arms, fingers, etc.

Some of the real world objects 206 are navigational real world objects comprising corresponding navigational virtual objects 214 representing navigable structures of the indoor environment 200. The navigational virtual objects 214 comprise navigation data and instructions defining one or more possible navigation paths for the robot 212 within the indoor environment 200. For example, the navigational virtual objects 214 of the indoor environment 200 comprise doors 216, floors 218, and stairs 220. The navigation route may, in some embodiments, be further calculated and dynamically updated by the navigation engine in view of the navigation data of the navigational virtual objects 214. In some embodiments, the navigational virtual objects are transmitted on demand to the robot 212 via the network as the robot 212 approaches the navigational real world objects. In some embodiments, the robot 212 further comprises at least one sensor 222. The navigation engine further utilizes the data captured by the at least one sensor 222 to update the navigation route of the robot 212 in real-time.

In the example illustration of FIG. 2, the robot 212 climbs the stairs 220 by receiving and executing data and instructions processed by at least one server computing device hosting the virtual world system and navigation engine comprising a navigation route. The navigation route may be computed by the navigation engine by using at least a navigation destination data input by, for example, a human or artificial intelligence user into the navigation engine, and one or more of the virtual three-dimensional geolocation coordinates of the stairs 220, the navigational data from the stairs 220, and the sensor data captured by the sensor 222 of the robot 212.

Figure 3:
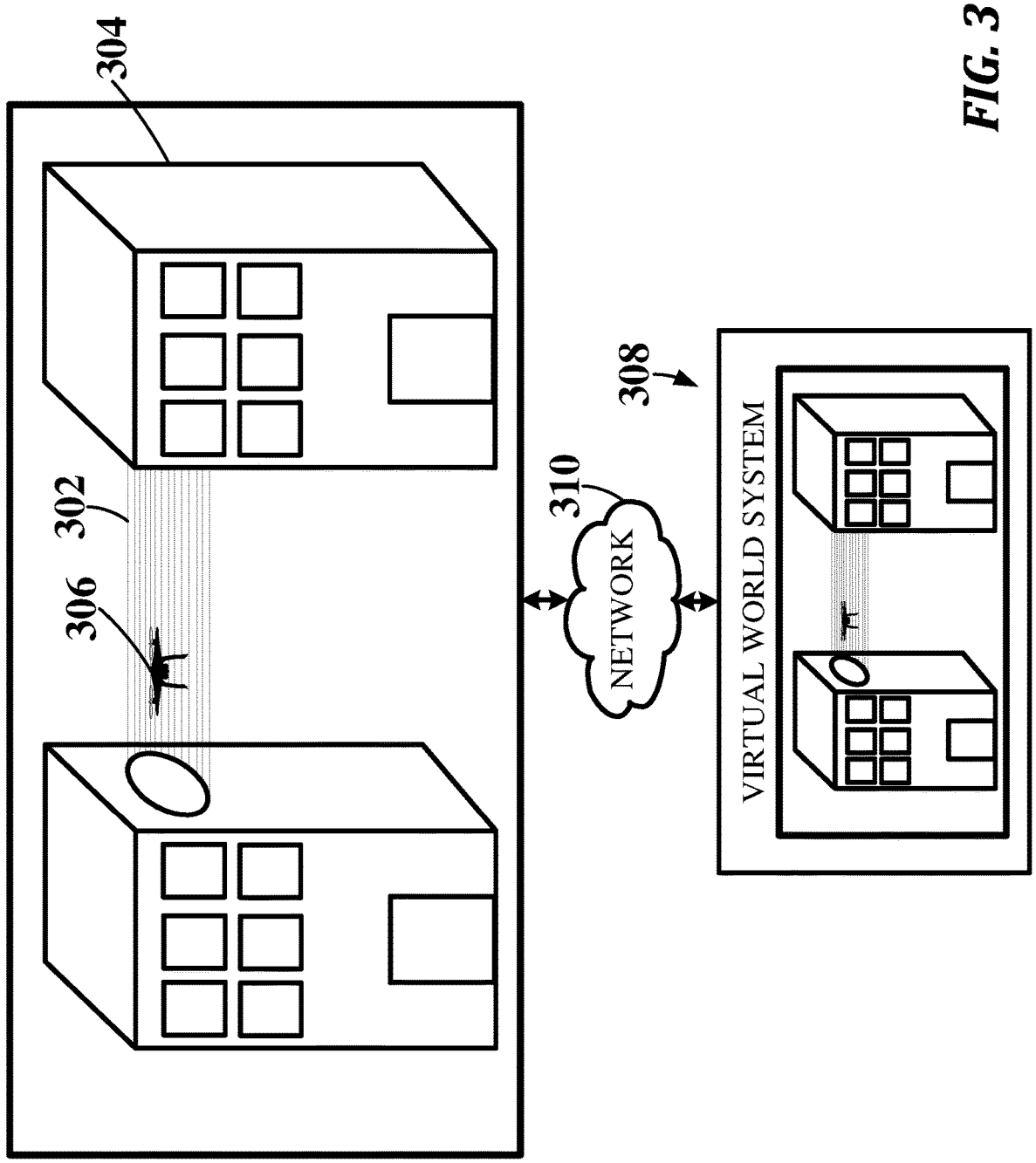
FIG. 3 depicts a schematic representation of virtual corridors connecting two buildings, used by a drone to move between the two buildings, according to an embodiment.

FIG. 3 depicts a schematic representation of an outdoor environment 300 comprising virtual corridors 302 connecting two buildings 304, used by a drone 306 to move between the two buildings, according to an embodiment. The outdoor environment 300 may be stored in a virtual world system 308 stored in at least one cloud server computing device and connected to a navigation engine computing the navigation route of the drone 306 through a network 310. The virtual corridors 302 may define a fixed or semi-fixed navigation route of the drone 306 by virtually setting the path of the drone 306 in the outdoor environment 300.

In one embodiment, the virtual corridor 302 are configured directly in the virtual world system as public virtual corridors 302 that may be used by any autonomous mobile robot, such as any other drone. In this embodiment, the navigation engine may only need to use the input navigation destination data to calculate the navigation route to include the virtual corridor 302, which may be transmitted to the drone 306 in real time. In other embodiments, the virtual corridor 302 is calculated ad hoc by the navigation engine based on the navigation destination data, and other data such as the three-dimensional geolocation coordinates of the buildings 304, the navigational data from the buildings 304, and sensor data captured by a sensor of the drone 306.

Figure 4:
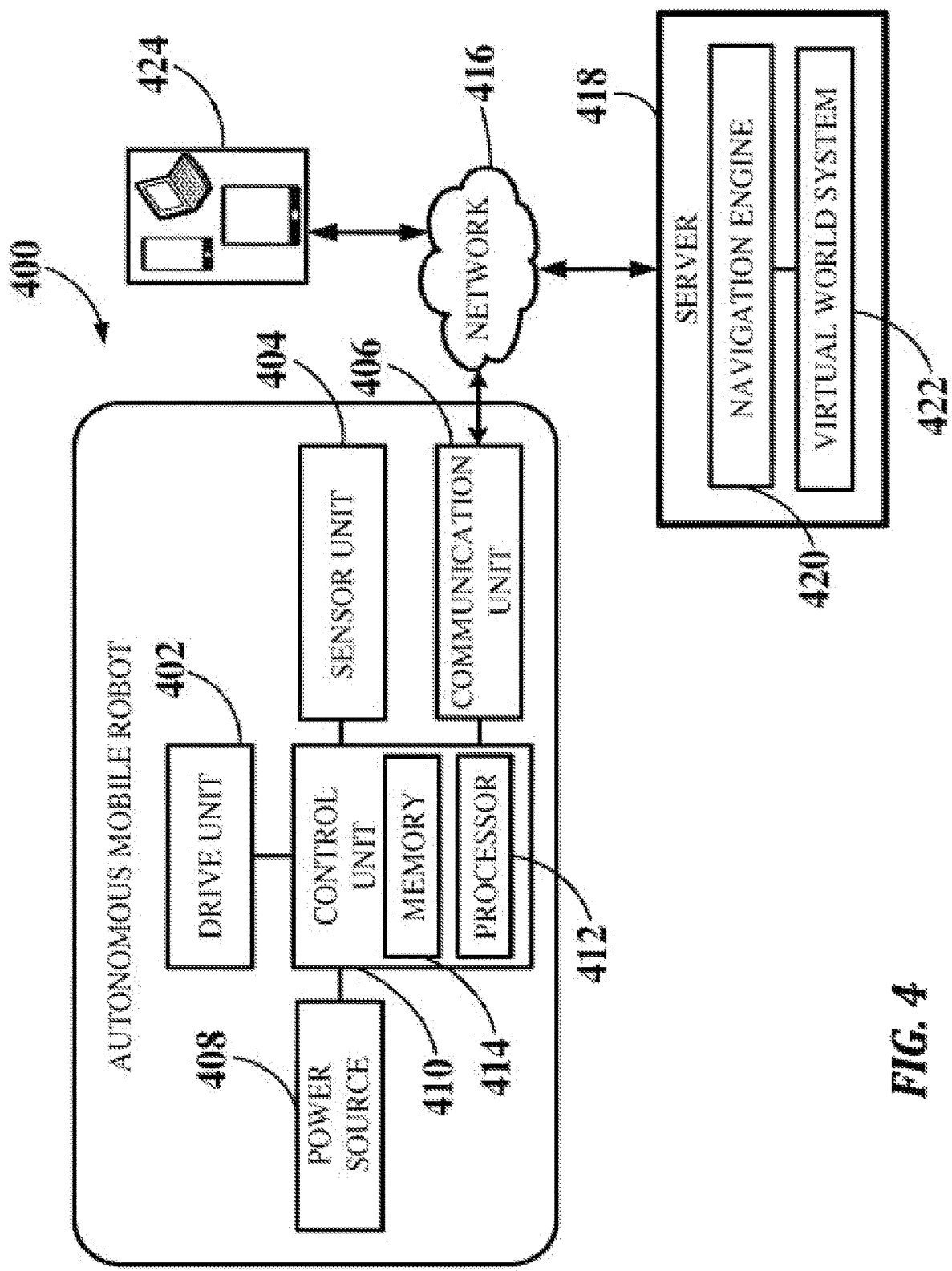
FIG. 4 depicts a schematic representation of an autonomous mobile robot using location-based autonomous navigation, according to an embodiment.

FIG. 4 depicts a schematic representation of an autonomous mobile robot 400 using location-based autonomous navigation, according to an embodiment.

The autonomous mobile robot 400 may comprise various operational components, such as a drive unit 402, a sensor unit 404, a communication unit 406, and a power source 408, all connected to a control unit 410 comprising at least one processor 412 and memory 414. Through the communication unit 406, the autonomous mobile robot 400 connects to a network 416 enabling connection to at least one server computing device 418 and to the navigation engine 420 and virtual world system 422 therein stored. The network 416 further enables connection of the autonomous mobile robot 400 with at least one user device 424 configured for inputting commands (e.g., navigation destination data) that may be received and processed by the navigation engine 420 for integrating into the navigation route.

The drive unit 402 may comprise a plurality of elements enabling the autonomous mobile robot 400 to move and perform one or more actions by converting signals from the control unit into a movement of the autonomous mobile robot 400. For example, the drive unit 402 can comprise motors, transmissions, wheels, wings, actuators, and effectors, or any other part and corresponding circuitry enabling the movement of the autonomous mobile robot 400.

The sensor unit 404 may comprise a plurality of sensors configured to determine and track the position and orientation of the autonomous mobile robot 400, to provide data points about the objects and the space around the autonomous mobile robot 400 that may be synchronized and shared with the virtual world system 422 in the server computing device 418, and to provide data representations of one or more physical properties of the real objects in the real world to the server computing device 418. In some embodiments, the sensor unit 404 may be implemented in a plurality of areas of the autonomous mobile robot 400 or in areas surrounding the autonomous mobile robot 400. For example, the sensor unit 404 may be positioned on a plurality of joints and connectors of autonomous mobile robot 400. Sensors of the sensor unit 404 may comprise, for example, optical and/or acoustic sensors such as triangulation sensors, cameras, laser scanners, ultrasonic scanners, tactile or touch-sensitive sensors for detecting obstacles, and the like. In other embodiments, sensors may also be included to provide data representations of other characteristics of the autonomous mobile robot 400 or surrounding areas, such as thermometers, pressure sensors, humidity sensors, and the like, as well as inertia sensors (e.g., IMUs, accelerometers, and gyroscopes) for determining the position and changes in the movement of the robot or wheel contact switches that detect a contact between a wheel and the floor.

The communication unit 406 may be implemented as computing software and hardware to communicatively connect to the network 416, receive computer readable program instructions from the at least one server computing device 418, and forward the computer readable program instructions for storage in the memory 414 for execution by the processor 412. The communication unit may comprise one or more transceiver (not shown) that may be implemented as computing software and hardware configured to enable real objects to receive wireless radio waves from antennas and to send the data back to the antennas. In some embodiments, millimeter-wave (mW) transceivers may be employed, which may be configured to receive mmW wave signals from antennas and to send the data back to antennas when interacting with immersive content. The transceiver may be a two-way communication transceiver.

The communication unit 406 may further enable connection of the autonomous mobile robot with the at least one user device 424 for receiving input data such as navigation destination data and/or task commands, and/or for displaying autonomous mobile robot status, such as location in the virtual world system, battery levels, functioning parameters, and the like. Said user devices 424 may be implemented as external computing pointing devices for selecting objects and options (e.g., a touch screen, mouse, 3D control, joystick, levers, steering wheels, gamepad, and the like) and/or text entry device for inputting manipulation commands (e.g., a keyboard, buttons, dictation tools, and the like) configured to interact with elements in the real world through the autonomous mobile robot 400.

The power source 408 is implemented as computing hardware configured to provide power to the autonomous mobile robot 400. In one embodiment, the power source 408 may be a battery. The power source 408 may be built into the autonomous mobile robot 400 or removable from the autonomous mobile robot 400, and may be rechargeable or non-rechargeable. In one embodiment, the devices may be repowered by replacing one power source 408 with another power source 408. In another embodiment, the power source 408 may be recharged by a cable attached to a charging source, such as a universal serial bus ("USB"), FireWire, Ethernet, Thunderbolt, or headphone cable, attached to a personal computer. In yet another embodiment, the power source 408 may be recharged by inductive charging, wherein an electromagnetic field is used to transfer energy from an inductive charger to the power source 408 when the two are brought in close proximity, but need not be plugged into one another via a cable. In another embodiment, a docking or base station may be used to facilitate charging.

The control unit 410 may be configured to generate commands for the autonomous mobile robot from instructions stored in memory received from the at least one server computing device 418. The processor 412 of the control unit 410 can be configured to process manipulation instructions directly via the user devices 424 or coming from the at least one server computing device 418 from the navigation engine 420. The processor 412 sends the processed instructions to the drive unit 402 for moving the corresponding parts that result in moving or performing tasks by the autonomous mobile robot. The processor 412 may also be capable of implementing analog or digital signal processing algorithms such as raw data reduction or filtering. In some embodiments, the processor 412 may share some computational tasks with the at least one server computing device 418.

The memory 414 may be implemented as computing software and hardware adapted to store application programs and receive data from, e.g., the navigation engine 420. The memory 414 may be of any suitable type capable of storing information accessible by the processor 412, including a computer-readable medium, or other medium that stores data that may be read with the aid of an electronic device, such as a hard-drive, memory card, flash drive, ROM, RAM, DVD or other optical disks, as well as other write-capable and read-only memories. The memory 414 may include temporary storage in addition to persistent storage.

Figure 5:
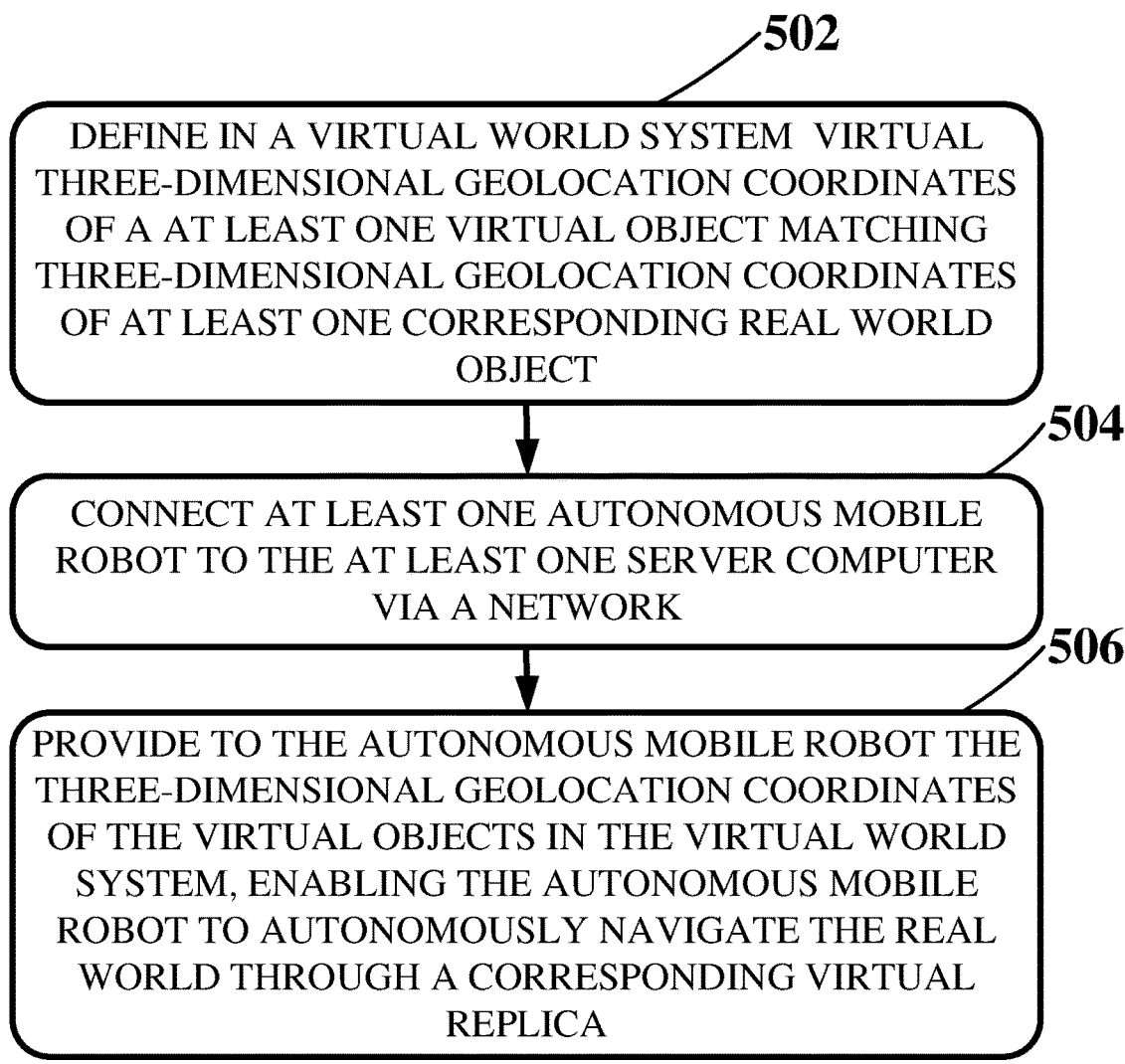
FIG. 5 depicts a schematic representation of a method enabling location-based autonomous navigation, according to an embodiment.

FIG. 5 depicts a schematic representation of a method 500 enabling location-based autonomous navigation, according to an embodiment.

The method begins in step 502 by defining, in a virtual world system provided in memory of at least one server computing device, virtual three-dimensional geolocation coordinates of at least one virtual object matching the three-dimensional geolocation coordinates of at least one corresponding real world object. The method continues in step 504 by inputting navigation destination data of an autonomous mobile robot through a navigation engine stored in memory of the at least one server computing.

Subsequently, in step 506, the method continues by computing, by the navigation engine, the navigation route of at least one autonomous mobile robot based on the navigation destination data and considering the three-dimensional geolocation coordinates of the at least one virtual object, enabling the at least one autonomous mobile robot to autonomously navigate the real world through a virtual replica of the at least one autonomous mobile robot comprised in the virtual world system connected to one or more corresponding motion mechanisms and circuitry.

In some embodiments, the method 500 further comprises providing, to some of the virtual objects, navigation data and instructions defining one or more possible navigation paths for the at least one autonomous mobile robot, creating navigational virtual objects representing navigable structures of the real world. In further embodiments, the method 500 comprises by the navigation engine, calculating and dynamically updating the navigation route, in view of the navigation data of the navigational virtual objects. The navigation data comprises a plurality of navigation paths including three-dimensional coordinates and a directional vector that may be used by the navigation engine to calculate the navigation route. The plurality of navigation paths may take into consideration other navigational virtual objects close to the autonomous mobile robot for determining the optimum path to be used in the computation of the navigation route.

In some embodiments, the method 500 further comprises transmitting the at least one navigational virtual object on demand to the at least one autonomous mobile robot via the network as the autonomous mobile robot approaches the real world object.

In some embodiments, the method 500 further comprises updating the navigation route in real-time using data captured by at least one sensor mounted on the autonomous mobile robot in conjunction with the data of the navigational virtual objects.

In some embodiments the virtual objects comprise the virtual replicas of real world elements, or purely virtual objects, or combinations thereof, wherein at least some of the purely virtual objects are virtual corridors defining the navigation path of the at least one autonomous mobile robot. In further embodiments, the method 500 further comprises virtually coupling at least two real world objects via a connection between the virtual corridor and the corresponding virtual replicas of the at least two real world objects.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system comprising:
    at least one server computing device having at least one processor and a memory that stores:
        a virtual world system comprising a plurality of virtual objects being spatially defined by virtual three-dimensional coordinates that correspond to three-dimensional coordinates of corresponding physical objects in a physical environment; and
        computer-readable instructions that, in response to execution by the at least one processor, cause the at least one server computing device to provide a navigation engine configured to compute a navigation route of an autonomous mobile robot using at least the virtual three-dimensional coordinates of a virtual object, enabling the autonomous mobile robot to autonomously navigate the physical environment by reference to a virtual replica of the physical environment comprised in the virtual world system;
    wherein at least one of the plurality of virtual objects includes a virtual corridor that virtually couples two physical objects via a connection between two other virtual objects of the plurality of virtual objects that correspond to the two physical objects, respectively,
    wherein the two physical objects comprise a sensing mechanism to enrich and synchronize the two other virtual objects based on sensed speed or acceleration data related to at least one of the two physical objects,
    wherein the virtual corridor is calculated ad hoc by the navigation engine based on the sensed speed or acceleration data.

2. The system of claim 1, wherein the navigation route is computed by the navigation engine using at least data captured by at least one sensor of the autonomous mobile robot.

3. A method comprising:
    creating, in a virtual world system provided in memory of at least one server computing device, a plurality of virtual objects, wherein the plurality of virtual objects are spatially defined by virtual three-dimensional coordinates that correspond to three-dimensional coordinates of corresponding physical objects in a physical environment;
    receiving, by a navigation engine stored in memory of the at least one server computing device, data defining a destination of an autonomous mobile robot; and
    computing, by the navigation engine, a navigation route for the autonomous mobile robot using at least the data defining the destination and the virtual three-dimensional coordinates of a virtual object, enabling the autonomous mobile robot to autonomously navigate the physical environment by reference to a virtual replica of the physical environment comprised in the virtual world system;
    wherein at least one of the plurality of virtual objects includes a virtual corridor that virtually couples two physical objects via a connection between two other virtual objects of the plurality of virtual objects that correspond to the two physical objects, respectively,
    wherein the two physical objects comprise a sensing mechanism to enrich and synchronize the two other virtual objects based on sensed speed or acceleration data related to at least one of the two physical objects,
    wherein the virtual corridor is calculated ad hoc by the navigation engine based on the sensed speed or acceleration data.

4. The method of claim 3, wherein computing the navigation route includes computing the navigation route using at least data captured by at least one sensor mounted on the autonomous mobile robot.

5. An autonomous mobile robot, comprising:
    a control unit comprising at least one processor and a memory;
    a drive unit configured to convert signals from the control unit into a movement of the autonomous mobile robot, wherein the drive unit comprises actuators, wherein the actuators comprise electric motors, hydraulic cylinders, pneumatic cylinders, or combinations thereof;
    a communication unit configured to communicatively couple the autonomous mobile robot to at least one server computing device storing a navigation engine and a virtual world system, wherein the communication unit comprises one or more transceivers, wherein the one or more transceivers comprise antennas; and
    wherein the memory has instructions stored thereon that, in response to execution by the at least one processor, cause the autonomous mobile robot to perform actions comprising:
        receiving a navigation route computed by the navigation engine of the at least one server computing device using at least virtual three-dimensional coordinates of a plurality of virtual objects in the virtual world system that correspond to three-dimensional coordinates of corresponding physical objects in a physical environment and navigation destination data; and autonomously navigating the physical environment using the navigation route;

wherein at least one of the plurality of virtual objects includes a virtual corridor that virtually couples two physical objects via a connection between two other virtual objects of the plurality of virtual objects that correspond to the two physical objects, respectively, wherein the two physical objects comprise a sensing mechanism to enrich and synchronize the two other virtual objects based on sensed speed or acceleration data related to at least one of the two physical objects, wherein the virtual corridor is calculated ad hoc by the navigation engine based on the sensed speed or acceleration data.

6. The autonomous mobile robot of claim 5, further comprising at least one sensor, wherein the actions further comprise:

transmitting data captured by the at least one sensor to the at least one server computing device for computing the navigation route.

7. A non-transitory computer-readable medium having computer-executable instructions stored thereon that, in response to execution by one or more processors of a server computing device, cause the server computing device to perform actions comprising:

creating, in a virtual world system provided in memory of at least one server computing device, a plurality of virtual objects, wherein the plurality of virtual objects are spatially defined by virtual three-dimensional coordinates that correspond to three-dimensional coordinates of corresponding physical objects in a physical environment;

receiving, by a navigation engine stored in memory of the at least one server computing device, data defining a destination of an autonomous mobile robot;

computing, by the navigation engine, a navigation route for the autonomous mobile robot using at least the data defining the destination and the virtual three-dimensional coordinates of a virtual object, enabling the autonomous mobile robot to autonomously navigate the physical environment by reference to a virtual replica of the physical environment comprised in the virtual world system;

wherein at least one of the plurality of virtual objects includes a virtual corridor that virtually couples two physical objects via a connection between two other virtual objects of the plurality of virtual objects that correspond to the two physical objects, respectively, wherein the two physical objects comprise a sensing mechanism to enrich and synchronize the two other virtual objects based on sensed speed or acceleration data related to at least one of the two physical objects, wherein the virtual corridor is calculated ad hoc by the navigation engine based on the sensed speed or acceleration data.

8. The system of claim 1, wherein the plurality of virtual objects in the virtual world system includes a navigational virtual object representing a navigable structure of the physical environment, the navigational virtual object comprising navigation data defining one or more possible navigation paths associated with the navigable structure.

9. The system of claim 8, wherein the navigation route is computed by the navigation engine using at least the navigation data of the navigational virtual object.

10. The system of claim 8, wherein the navigational virtual object is transmitted to the autonomous mobile robot via a network as the autonomous mobile robot approaches the navigable structure.

11. The method of claim 3, wherein the plurality of virtual objects in the virtual world system include a navigational virtual object representing a navigable structure of the physical environment, the navigational virtual object comprising navigation data defining one or more possible navigation paths associated with the navigable structure.

12. The method of claim 11, wherein computing the navigation route includes computing the navigation route using at least the navigation data of the navigational virtual objects.

13. The method of claim 11, further comprising transmitting the navigational virtual object to the autonomous mobile robot via a network as the autonomous mobile robot approaches a physical structure.

14. The autonomous mobile robot of claim 5, wherein the plurality of virtual objects in the virtual world system includes a navigational virtual object representing a navigable structure of the physical environment, the navigational virtual object comprising navigation data defining one or more possible navigation paths associated with the navigable structure.

15. The autonomous mobile robot of claim 14, wherein the navigation route is computed by the navigation engine using at least the navigation data of the navigational virtual object.

16. The autonomous mobile robot of claim 14, wherein the actions further comprise receiving the navigational virtual object from the at least one server computing device as the autonomous mobile robot approaches the navigable structure.

17. The non-transitory computer-readable medium of claim 7, wherein the plurality of virtual objects in the virtual world system includes a navigational virtual object representing a navigable structure of the physical environment, the navigational virtual object comprising navigation data defining one or more possible navigation paths associated with the navigable structure.

18. The non-transitory computer-readable medium of claim 17, wherein the actions further comprise transmitting the navigational virtual object to the autonomous mobile robot via a network as the autonomous mobile robot approaches a physical structure.

* * * * *